Figure 1:
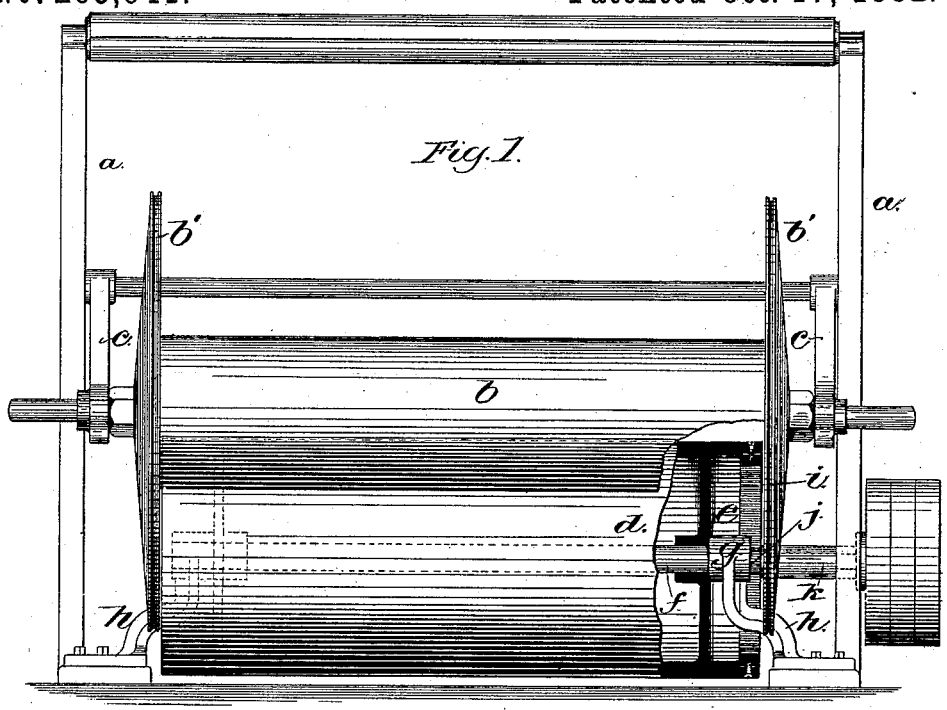

(No Model.)

W. BANCROFT.
WARPING MACHINE.

No. 265,941. Patented Oct. 17, 1882.

Witnesses.
John F. C. Preinkert
Fred A. Powell

Inventor:
William Bancroft
By Crosby & Gregory
Attys.

UNITED STATES PATENT OFFICE.

WILLIAM BANCROFT, OF HOPEDALE, MASSACHUSETTS.

WARPING-MACHINE.

SPECIFICATION forming part of Letters Patent No. 265,941, dated October 17, 1882.

Application filed April 13, 1882. (No model.)

*To all whom it may concern:*

Be it known that I, WILLIAM BANCROFT, of Hopedale, county of Worcester, State of Massachusetts, have invented an Improvement in Warping-Machines, of which the following description, in connection with the accompanying drawings, is a specification.

My invention in warping-machines has for its object to enable the use therein of a section-beam having the largest possible flanges or heads at its ends, with a given size of barrel, with the smallest possible cylinder for its support, thus increasing the capacity of the beam, the said beam being employed with a supporting cylinder and roller sustained in its bearing in a novel manner.

As heretofore commonly constructed the supporting-cylinder, upon which the yarn or section beam rests, and by which it is turned while the threads are being wound thereon, has been mounted on a central shaft, which projects beyond the ends of the said cylinder, where it has been provided with an actuating pulley or gear. Owing to the projection of the said shaft from the end of the said cylinder, the width of the flange or head at the end of the yarn-beam cannot be greater than the difference between the radius of the said cylinder and that of its shaft, and consequently for beams having a flange or head above a given size different machines having a large supporting-cylinder have had to be employed.

By my present invention I am enabled to use in the same machine, and in connection with the same supporting-cylinder, which may be much smaller than the smallest size commonly employed, yarn-beams having heads or flanges of any particular size, the said flanges being larger than can be employed in any ordinary warping-machine. I am enabled to secure this great advantage by supporting the ends of the shaft of the cylinder within the planes of rotation of the inner faces of the heads of flanges of the yarn-beam.

My invention consists in a yarn-beam, a supporting cylinder or roller, and means to rotate it, combined with bearings or supports for the said cylinder or roller, located within the planes of rotation of the inner faces of the flanges or heads of the yarn-beam, whereby the heads or flanges of the yarn-beam may extend across the ends and past the center of the said cylinder or roller. As herein shown, the supporting-cylinder has its shaft terminated within the ends or bases of the said cylinder, and the cylinder and its shaft are less in length than the distance between the heads or flanges of the yarn-beam, and the said shaft is supported by brackets or hangers fixed at a point outside and curved over the edge or periphery of the said cylinder to the inside thereof. The cylinder is in this instance provided with an internal gear within one of its ends, which is acted upon by a pinion upon a short shaft outside the said cylinder, the said shaft being provided with the usual driving-pulleys. By this arrangement it will be seen that the only devices which project beyond the ends of the cylinder are a portion of its supporting-bracket and the shaft by which it is actuated, and that these are located near the periphery of the cylinder, at one side thereof, away from the axis of the yarn-beam, thus permitting a cylinder of small size to revolve a yarn-beam of any desired size, the flanges or heads of which extend more or less beyond the center of the said cylinder.

Figure 2:
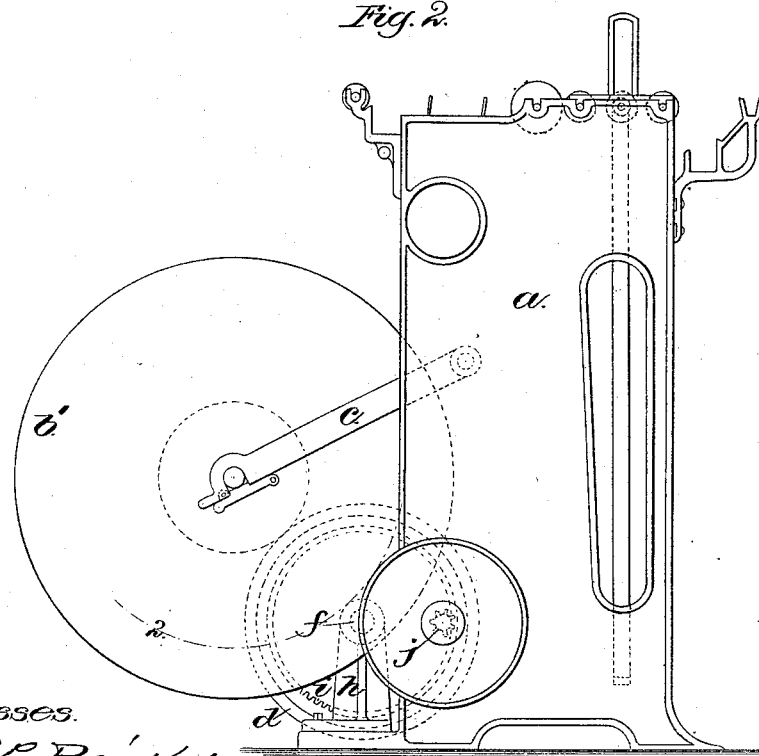

Figure 1 is a front elevation of a sufficient portion of a warping-machine to illustrate my invention; and Fig. 2, an end elevation thereof, showing a yarn-beam having larger heads than could be employed with a machine having a cylinder of the ordinary size.

The dotted circle 2, Fig. 2, shows the largest-sized beam-head that could be employed in a warping-machine of common construction with a cylinder of the size herein shown.

The frame-work *a* and the yarn-beam *b*, supported in the swinging bearings *c*, may be the same as in any warping-machine heretofore in use. The supporting cylinder or roller *d*, upon which the yarn-beam *b* rests, and by which it is rotated to wind the yarn thereon, is shown as provided with hollow ends or heads *e*, (see Fig. 1,) suitably joined therewith or made as a part of it.

The journals of the shaft *f* are sustained by bearings *g*, located wholly within the ends of the said cylinder, as shown in Fig. 1. The bearings *g* are sustained upon brackets *h*, fixed upon the frame-work in any usual manner, and curved, as shown, to pass within the ends of the cylinder.

The cylinder *d* is provided at one end with an internal gear, $i$, which is engaged by the pinion $j$ of a short shaft, $k$, supported in the frame-work $a$, the said shaft $k$ being provided with pulleys to receive a driving-belt, as usual.

It will be seen that the shaft $k$ and that portion of the bracket $h$ that enters the end of the cylinder are located between the axis and periphery of the said cylinder on the side away from the axis of the warp-beam $b$, so that the peripheries of the heads or flanges $b'$ can pass beyond the axial center or middle of the said cylinder, the said flanges passing over the ends of the shaft $f$, as shown in Fig. 2, while if the cylinder $f$ were sustained in the usual manner upon a shaft extending out beyond its ends and mounted in bearings outside of the cylinder the largest flange that could be employed for the yarn-beam would be that shown by the dotted circle 2, Fig. 2.

It is obvious that the cylinder $d$ can be supported by other equivalent bearings and be rotated or actuated by other than the precise devices herein shown, the essential feature of my invention being that nothing is permitted to project beyond the end of the said cylinder or for a sufficient distance from the edge thereof upon which the yarn-beam rests which will interfere with the passage of the flanges of the said yarn-beam beyond the middle of the said cylinder.

I claim—

The yarn-beam, the supporting cylinder or roller, and means to rotate it, combined with bearings or supports for the said cylinder or roller, located within the planes of rotation of the inner faces of the flanges or heads of the yarn-beam, whereby the said flanges or heads may extend past the axial center of the said cylinder, as and for the purpose described.

In testimony whereof I have signed my name to this specification in the presence of two subscribing witnesses.

WILLIAM BANCROFT.

Witnesses:
E. D. BANCROFT,
GEO. A. DRAPER.